Nov. 7, 1961 H. K. M. GROSSER ET AL 3,007,998

AUTOMATIC TELEGRAPH SYSTEM

Filed June 25, 1956 3 Sheets-Sheet 1

INVENTORS
HERMANN KARL MARIA GROSSER
HANS JACOB SPOON
BY Fred M. Vogel
AGENT

Nov. 7, 1961 H. K. M. GROSSER ET AL 3,007,998

AUTOMATIC TELEGRAPH SYSTEM

Filed June 25, 1956 3 Sheets-Sheet 2

INVENTOR
HERMANN KARL MARIA GROSSER
HANS JACOB SPOON
BY Fred M. Vogel
AGENT

INVENTORS
HERMANN KARL MARIA GROSSER
HANS JACOB SPOON
BY Fred M. Vogel
AGENT

United States Patent Office 3,007,998
Patented Nov. 7, 1961

3,007,998
AUTOMATIC TELEGRAPH SYSTEM

Hermann Karl Maria Grosser and Hans Jacob Spoon, both of Hilversum, Netherlands, assignors, by mesne assignments, to North American Philips Company, Inc., New York, N.Y., a corporation of Delaware Filed June 25, 1956, Ser. No. 593,486
Claims priority, application Netherlands Sept. 14, 1955
3 Claims. (Cl. 178—2)

This invention relates to automatic telegraph systems in which lines for various directions are connected to outlets of a number of selectors.

In the automatic telegraph system according to the invention, an individual waiting outlet is allotted to any one direction, to which outlet a waiting circuit is connected and to which a plurality of selectors can be adjusted simultaneously, the selectors first being numerically set to the waiting outlet of the desired direction. The control circuits of the selectors comprise a device for determining the time during which the selector is set to a waiting outlet. When a line is free or becomes free in the desired direction, a selector which has waited the longest time, is adjusted to this line which is then marked from the waiting circuit concerned.

This arrangement has the advantage that lines operate with a high efficiency.

In a first form of the system according to the invention, the control circuits of the selectors are connected by way of a number of common multiple-conductors to a common indicating device to the waiting outlet of which, if a line in a given direction is free, a selector is adjusted, which causes switching means to respond, through which switching means and via a wiper of the selectors adjusted to the waiting outlet, a signal is transmitted to the control circuits of said selectors. Time measuring devices of each of said selectors subsequently mark one of the multiple conductors in accordance with the delay of the selectors concerned. Furthermore, the indicating device tests the multiple conductors in the sequence of decreasing delay and the indicating device indicates by means of a locking circuit a selector which marks the multiple corresponding to the longest delay at this instant.

In another form, the control circuits of the selectors are connected through a number of common multiple conductors to a common allotter to a delay outlet of which, if a line is free in a given direction, a selector is set, which causes switching means in the associated control circuit to respond through a wiper of the selector concerned, under the control of which switching means the associated time-measuring device of the selectors marks one of the multiple conductors in accordance with the delay, and furthermore a signal is supplied to the common allotter which subsequently tests the multiple conductors in the sequence of decreasing delay and allots by means of a blocking circuit a selector which marks the multiple corresponding to the then longest delay.

In order that the invention may be readily carried into effect two examples will now be described in detail with reference to the accompanying drawings, in which—

Figure 1:
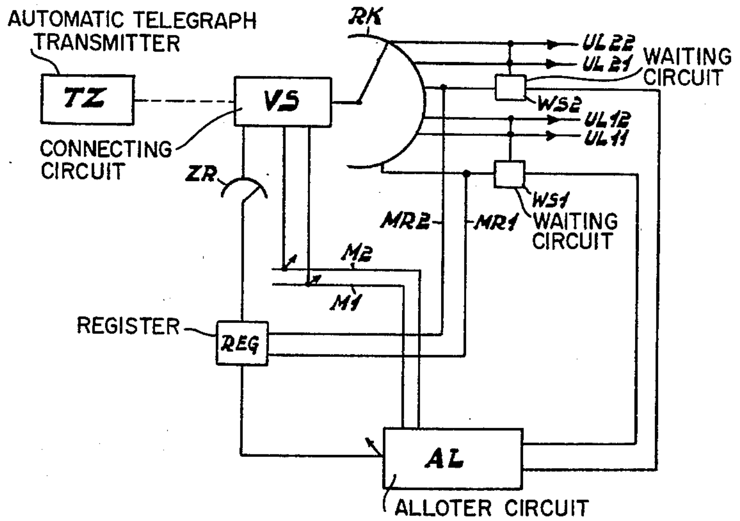
FIG. 1 is a routing plan.

In FIG. 1, the reference numeral TZ denotes an automatic telegraph transmitter, for example a tape transmitter, in which a message, upon reception in the telegraph exchange, is provisionally recorded. In order to redespatch the message to its destination the transmitter TZ engages in a manner not further indicated, a connecting circuit VS which co-acts with a selector RK. The selector RK is associated with a group of selectors, to the outlets of which a number of outgoing lines of different directions are multipled. In the drawings, two outgoing directions are shown by way of example, the lines UL11 and UL12 being associated with the first direction and the lines UL21 and UL22 to a second direction. To each outgoing direction an additional outlet is allotted to which no outgoing line is connected and which is connected to a waiting circuit. Thus, for example, the waiting circuit WS1 corresponds with the first direction and the waiting circuit WS2 to the second direction. Fundamentally, the various outlets may be connected in arbitrary sequence to the selector bank. Upon connecting the connecting circuit VS, via the register finder ZR, to a free register REG, the telegraph transmitter TZ transmits in code the destination of the despatch, the register subsequently analysing the desired outgoing direction and transmitting a signal to the allotter circuit AL common to all outgoing directions that can be reached over the selectors RK or, if desired, common to the whole telegraph exchange. The device AL comprises a locking circuit which is designed in such maner that the various registers and waiting circuits are mutually blocked such that only one selector can be adjusted at a time. Upon the register REG having been allotted by the allotter circuit AL for adjusting the selector RK, the register marks via one of the marking conductors MR1 or MR2 the outlets associated with the waiting circuit of the desired outgoing direction and adjusts the selector to this waiting circuit, for example WS1. The register releases itself and the selector RK retains its position until a line becomes free in the desired direction. If desired, a plurality of selectors may wait simultaneously for a free line at a waiting circuit. Each connecting circuit VS comprises a device for determining the time during which the selector has had to wait. When a line becomes free the associated waiting circuit, provided that at least one selector is waiting, transmits a signal to the common allotter circuit AL which allots the waiting circuit in question. The waiting circuit subsequently energizes a relay in all the connecting circuits VS, the selector RK of which is adjusted to the waiting circuit, and this via a wiper of the selector. Under the control of the associated time measuring devices the connecting circuits VS concerned subsequently each mark one of the common marking multiples M1, M2 and so on to the device AL and this in accordance with the time during which the connecting circuit concerned has waited. Thus, for example, a connecting circuit, which has waited only a short time, marks the multiple M1, a connecting circuit, which has waited one to two minutes, marking the multiple M2 and so on. The device AL tests the several marking multiples, first of all the multiple corresponding to the longest delay. The device AL allots the connecting circuit which has waited the longest time or, if a plurality of connecting circuits mark the same marking multiple, it makes a choice from these circuits by means of a second locking circuit. The circuit allotted subsequently adjusts the selector RK to the free line then marked by the corresponding waiting circuit.

The operation of the system will now be described in detail with reference to FIG. 2. In the drawing the relays are denoted by capitals and the associated contacts by corresponding small letters followed by an index. The drawing shows part of a connecting circuit VS, a waiting circuit WS, an allotter AL and a line circuit LS. On engaging the connecting circuit VS, the busy relay ST is energized by means not further indicated. After a register has been connected to the connecting circuit and the numerical data have been received, the register energizes the relay RB of the device AL via the line RG1. The relay RB forms part of a locking circuit RS which comprises a relay of each register and a relay of each waiting circuit, for example the relay RA of the waiting circuit WS. The several relays are connected accordingly. The change-over contacts *ra*1, *rb*1 and so on constitute a relay chain circuit, whose make-contacts of the relays associated with a waiting circuit are connecting to a relay H of this circuit, and the make-contacts of the relays associated with a register are connected via a conductor RG2 to this register. When the relay RB becomes energized the relay GR becomes energized via the make-contact *rb*3, the relay RB closing, via the contact *rb*2 and the second winding, a holding circuit for itself. The relay GR connects, via the make-contact *gr*1, the input of the chain circuit *ra*1, *rb*1 to earth, and subsequently a relay of the register is energized via the conductor RG2 to indicate that the register has been allotted to control the selector RK. The register marks the waiting circuit WS of the desired outgoing direction by applying a voltage to the marking conductor MR1 and connects in a manner not further indicated the conductor RG3 to earth with the result that the relay V of the connecting circuit VS becomes energized via break-contact *p*1. The relay V closes an energisation circuit for the rotary magnet D of the selector RK, which circuit extends from earth via make-contact *st*1, break-contact *t*1, make-contact *v*1, the winding of the rotary magnet D to the negative pole of a battery (not shown), the positive terminal of which is earthed. As a result, the selector is operated in order to find the waiting circuit concerned. Upon the wiper *b* of the selector RK reaching the outlet contact connected to the marking conductor MR1, the relay T becomes energized via make-contact *st*1, make-contact *v*2, the winding of relay T, wiper and contact *b* of the selector RK, the marking conductor MR1 to the register. Break-contact *t*1 interrupts the energisation circuit of the rotary magnet D with the result that the selector stops moving and the make-contact *t*1 completes an energisation circuit for relay P via make-contacts *st*1, *t*1 and break-contact *q*1. The break-contact *p*1 interrupts the energisation of relay V. When make-contact *v*2 opens the relay T becomes de-energized so that the relay Q becomes energized in series with the relay P via make-contact *p*3. Thereby, the relay W of the waiting circuit WS becomes energized via make-contact *st*1, break-contact *v*2, make-contact *q*2, wiper and contact *c* of the selector RK and the winding of the relay W, as an indication that a selector is adjusted to the waiting circuit and is waiting for a free line in the direction concerned. Opening of break-contact *p*1 results in transmitting a signal to the register which is subsequently disconnected. The connecting circuit comprises a counting circuit TS for determining the delay in waiting for a free line in the desired direction. The counting circuit is controlled by a pulse-contact *si* of a pulse-producer (not shown) which periodically supplies a pulse, say every minute. After adjusting the selector RK to the waiting circuit WS, the relay TA becomes energized, on closing the pulse-contact *si*, via make-contact *p*2, the winding of the relay TA, break-contact *tb*1 and pulse-contact *si*. Opening of the contact *si* results in the relay TB in series with the relay TA becoming energized via make-contact *ta*1. On reclosing the pulse-contact *si*, after 1 minute, the relay TC becomes energized via pulse-contact *si*, make-contact *tb*1 and break-contact *td*1 and, on opening pulse-contact *si*, the relay TD becomes energized in series with the relay TC via make-contact *tc*1. Similarly, the relays TE and TF become energized one minute later. The change-over contacts *tb*2, *td*2 and *te*2 are inserted in a chain circuit, the outlets of which are connected to the multiple conductors M1, M2, M3 and M4 to the indicating device AL. Naturally, the number of relays of the counting circuit TS and the number of multiple conductors may be extended according to want.

Upon a line becoming free in the desired direction, the relay L becomes de-energized in the line circuit LS concerned. As a result the relay RA in the locking circuit RS of the device AL becomes energized via break-contact *l*1 and make-contact *w*1, and via break-contact *gr*1. If, on setting the selector RK to the waiting circuit VS, a free line is already available, the relay RA naturally becomes directly energized, and if a line becomes free at an instant at which no selector is waiting at the waiting circuit this has no further consequences, since the relay W is then not magnetized. Upon energisation of the relay RA, the relay GR of the device AL becomes energized via make-contact *ra*3. In this manner all the remaining waiting circuits and registers are provisionally blocked. Furthermore the relay RA completes via make-contact *ra*2 a holding circuit for itself via its second winding, make-contact *w*1 and break-contact *l*1. Via make-contacts *gr*1 and *ra*1, the relay H subsequently becomes energized in the waiting circuit WS. Upon the relay H becoming energized, the relay B of all the connecting circuits VS, the selector RK of which has been set to the waiting circuit WS, becomes energized via make-contact *h*1, the wiper and the contact *d* of the selector RK, the winding of the relay B, break-contact *v*2 and make-contact *st*1. The device AL comprises a second locking circuit AS constituted by the relays KA, KB and so on individually associated with all the connecting circuits VS. The locking circuit AS corresponds to the locking circuit RS. Upon the relay B becoming energized make-contact *b*1 connects, via the chain circuit of the change-over contacts *tb*2, *td*2, *tf*2, one of the multiple conductors M1, M2, M3 or M4, that is to say in accordance with the time during which the selector has had to wait, to the individual relay KA of the connecting circuit of the device AL concerned. In the sequence of increasing delay, the multiples M1, M2, M3, M4 are thus marked. If desired, one and the same multiple may be marked simultaneously by two or more connecting circuits VS, the delay of which is approximately the same. Upon the relay H of the waiting circuit WS becoming energized, the relay A of the device AL becomes energized via make-contact *h*2, while in the released line circuit LS the make-contact *h*3, via break-contact *l*2, connects the outlet contact *b* of the selector RK corresponding to said circuit to the negative terminal of the battery in order to mark the selector outlet concerned. The device AL comprises a pulse counting circuit US which comprises relays AA, AB, AC, AD, AE and AF and corresponds to the counting circuit TS of the connecting circuit VS. The counting circuit US is controlled by pulse-contact *ic* of a pulse-producer (not shown). Upon energisation of the relay A, similarly to the relays of the counting circuit TS, the relays AA, AB and so on of the counting circuit US become successively energized, resulting in the device AL, via make-contact *a*2 and contacts of the chain circuit *ab*2, *ad*2 and *af*2 successively connecting the multiples M4, M3, M2 and M1 to the negaitve terminal of the battery, that is to say first the multiple corresponding to the longest delay and subsequently in the sequence of decreasing delay. Upon a multiple being connected to the battery, which multiple is connected via contacts of the chain circuit *tb*2, *td*2, *tf*2 and make-contact *b*1 of a connecting circuit VS to the corrresponding relay KA of the sluice circuit AS, this relay KA becomes energized via break-contact *gs*1. If the same multiple is simultaneously marked by two or more connecting circuits VS, the relays KA, KB and so corresponding to these connecting circuits also become energized simultaneously in the sluice circuit AS. The sluice circuit AS serves to make choice from said connecting circuits. Upon the relay KA, and as the case may be also the relay KB, becoming energized the relays GS and S are energized via make-contacts *ka*3 and *ka*4. The break-contact *s*1 opens the pulse-circuit of the counting circuit US so that the latter is locked up in position and no further multiples M1, M2 and so one are tested. The relay GS becomes enerergized in a slightly retarded manner so that all the individual relays KA, KB and so on of the connecting circuits VS concerned may become energized prior to opening of break-contact *gs1*. Via make-contacts *ka2* and *kb2* and a second winding of their own, the relays KA and KB complete a holding circuit for themselves. The relay V of the connecting circuit VS, which corresponds to the relay KA, becomes energized via make-contacts *gs1*, *ka1* and *p1*. However, the relay V of the connecting circuit, which corresponds to the relay KB, cannot become energized since the break-contact *ka1* is open.

The make-contact *v1* closes an energisation circuit for the rotary magnet D of the selector RK in the allotted connecting circuit VS via a break-contact *t1* and make-contact *st1* thus operating the selector in order to find the outlet which corresponds to the free line and is marked via make-contact *h3* and break-contact *l2*. The make-contact *v2* completes, in series with make-contacts *st1* and *h4*, beyond the wipers of the selector RK, a holding circuit for the relay W of the waiting circuit WS in order to prevent de-energisation of the relay W if the selector leaves the waiting outlet and no other selector were adjusted to the waiting circuit, since otherwise opening of the make-contact *w1* would cause the relay RA in the common device AL to become de-energized and the mutual blocking to be removed. Upon the selector RK reaching the free line, the relay T becomes energized in a circuit extending via make-contacts *st1* and *v2*, the winding of relay T, the wiper and the contact *b* of the selector RK, break-contact *l2* and make-contact *h3*. The break-contact *t1* opens the energisation circuit of the rotary magnet D, and the selector RK stops. The make-contact *t1* closes, via make-contacts *st1* and *q1*, an energisation circuit for the relay C. The break-contact *c2* opens the energisation circuit of the relays P and Q, so that the make-contact *p2* disconnects the counting circuit TS, while the make-contact *p1* opens the energisation circuit of the relay V. Upon opening of the break-contact *v2*, the relay B had meanwhile become de-energized with the result that the holding circuit of the relay KA of the device AL was interrupted by make-contact *b1*. However, the relay KA remained locked up in a circuit extending via make-contact *ka2*, a winding of the relay KA, make-contact *v3* and break-contact *c1*. On the relay C becoming energized, the last-mentioned circuit opens and the relay KA becomes de-energized. Furthermore, the relay L of the line circuit LS becomes energized via contact and the wiper *c* of the selector RK and make-contact *c3*. The break-contact *l1*, interrupts the energisation circuit of the relay RA of the device AL so that this relay becomes de-energized, at least provided that, at this instant, no second free line is free in the direction concerned and a selector RK is waiting at the waiting outlet WS. In the last-mentioned case the relay RA will have been held and, on the relay KA becoming de-energized, the relay of the connecting circuit corresponding to the relay KB will have become energized via make-contact *gs1*, *ka1* and make-contact *p1* of the connecting circuit concerned, thus adjusting, in the aforesaid manner, the selector RK of the connecting circuit concerned to the second free line. If no free line is available and/or no selector is waiting at the waiting circuit WS, the rleay RA becomes de-energized, followed by the relay H of the waiting circuit WS with the result that make-contact *h1* opens the energisation circuit for the relay B in any selector which still set to the waiting circuit WS. When the make-contact *h2* opens the relay A becomes de-energized and the counting circuit US resumes its rest position. The message can now be transmitted via conductor TZ1, the wiper and the make-contact *a* of the selector RK just adjusted, the make-contact *l3* of the selected line circuit and the conductor UL to its destination.

Figure 2:
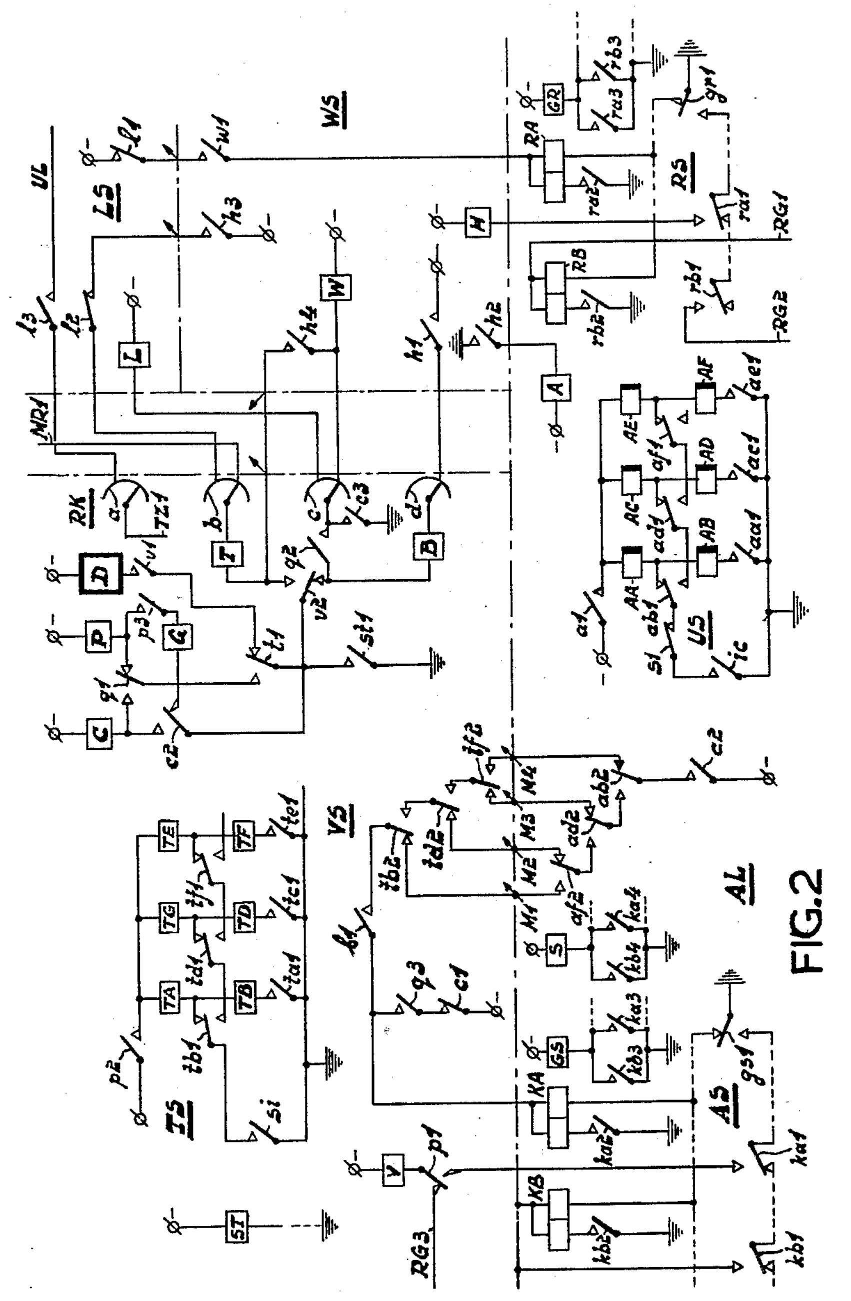
FIG. 2 shows in a simplified manner part of an automatic telegraph exchange.
Figure 3:
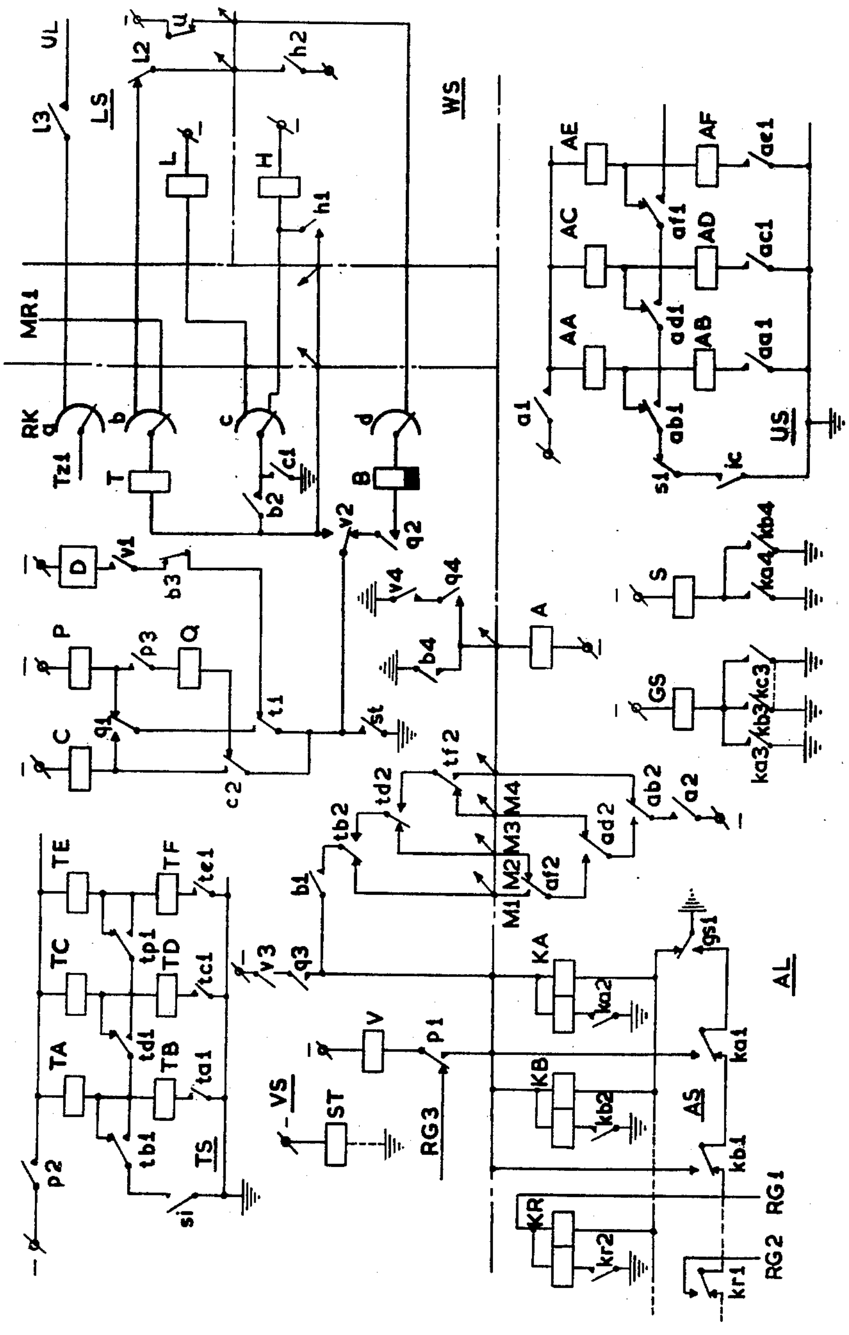
FIG. 3 shows another form.

In the circuit arrangement shown in FIG. 3, similarly as in that shown in FIG. 2, engagement of a connecting circuit VS causes a holding relay ST to become energized by means not further indicated. Upon a register having been connected to the connecting circuit and having received the numerical data, the register energizes a relay KR of an allotter AL through a conductor RG1. A relay KS forms part of a locking circuit AS which comprises a relay KR of each register and a relay KA, KB and so on pertaining to each connecting circuit VS. The several relays are uniformly connected. Change-over contacts *ka1, kb1* . . . *kr1* constitute a chain circuit. The relay KS completes through its make-contact *kr2* a holding circuit for itself, while a relay GS becomes energized through make-contact *kr3*, a conductor RG2 thus being connected to earth through make-contact *gs1*, break-contacts *ka1*, *kb1* and make-contact *kr1*, which is indicative of the register having been allotted for controlling the selector RK. The register marks a delay circuit WS, which corresponds to the desired direction, by applying a voltage to a marking conductor MR1 and links, in a manner not further indicated, a conductor RG3 to earth, which results in the relay V of the connecting circuit VS becoming energized through break-contact *p1*. The relay V completes through make-contact *st*, break-contacts *t1*, *v3* and make-contact *v1* an energisation circuit for the rotary magnet D of the selector RK, which results in that the selector is actuated for seizing the marked outlet. When the selector reaches this outlet the test relay T in the connecting circuit VS becomes energized through the marking conductor MR1, wiper and contact *b* of the selector RK, winding of relay T and make-contacts *v2* and *st*. The break-contact *t1* interrupts the energisation circuit of the rotary magnet D and the make-contact *t1* completes the energisation circuit for the relay P through make-contacts *st1*, *t1* and break-contact *q1*. Break-contact *p1* interrupts the energisation circuit of relay V so that a signal is passed to the register which then becomes disengaged and causes the relay KR to become de-energized. The opening of then make-contact *v2* causes the relay T to become de-energized, which results in the relay Q becoming energized in series with relay P through make-contact *v3*, winding of relay Q, break-contact *c2* and make-contact *st*. The connecting circuit VS comprises a counting circuit TS for determining the time during which the selector has to wait for a free line in the desired direction. The counting circuit is controlled by a pulse-contact *si* of a pulse generator (not shown) periodically supplying a pulse, say every minute. After setting the selector RK to the delay circuit WS, closure of pulse-contact *si* results in energizing the relay TA through make-contact *p2*, winding of relay TA, break-contact *tb1* and pulse-contact *si*, while the opening of the contact *si* results in energizing the relay TB in series with the relay TA through make-contact *ta1*. Upon the pulse-contact *si* being re-closed after one minute, the relay TC becomes energized, while the opening of the contact *si* causes the relay TD to become energized. Similarly, the relays TE and TF become energized one minute later. The change-over contacts *tb2*, *td2* and *tf2* are inserted in a chain circuit, the outlets of which are connected to the multiple conductors M1, M2, M3 and M4 to the allotter AL.

Upon a line becoming free in the desired direction, the relay L of the line circuit LS becomes de-energized. As a result the relay B, in the connecting circuit VS of all the selectors waiting at the delay circuit WS concerned, becomes energized through the wiper and contact *d* of the selectors concerned, winding of relay B, make-contact *q2*, break-contact *v2* and make-contact *st*. The make-contact *b1* links the inlet of the chain circuit comprising change-over contacts *tb2*, *td2*, *tf2* to a winding of the relay KA in the locking circuit AS of the allotter AL. In this arrangement, the relay A becomes energized through the make-contact *b4*, resulting in the make-contact *a1*, the counting circuit US of the allotter AL being operated for testing multiple conductors M1, M2, M3, M4 in sequential order. The counting circuit US comprises relays AA, AB, AC, AD, AE and AF and corresponds to the counting circuit TS. Under the control of the pulse-contact *ic* the relays AA, AB, AC and so on become successively energized. The change-over contacts *ab2*, *ad2* and *af2* constitute another chain circuit, the outlets of which are connected to multiple conductors M1, M2, M3 and M4 in such manner that under the control of the counting circuit US the multiple conductors M4, M3, M2 and M1 are successively connected through said chain circuit and make-contact *a2* to the battery, that is to say first the conductor corresponding to the longest delay and subsequently in the sequence of decreasing delay.

Upon a multiple conductor being connected to the battery, which, through contacts of the chain circuit *tf2*, *td2*, *tb2* and make-contact *b1* is connected to a relay KA, KB and so on in the allotter AL, this relay becomes energized through break-contact *gs1*. If the same multiple conductor is simultaneously marked by two or more connecting circuits, the selectors of which may be set to different delay circuits, the corresponding relays KA, KB of the locking circuit AS become simultaneously energized. The locking circuit AS serves to make a choice from the connecting circuits. Upon energisation of the relay KA and, as the case may be, of the relay KB pertaining to a different connecting circuit, the relays GS and S of the allotter AL become energized through make-contacts *ka3*, *ka4*, and *kb3*, *kb4* respectively. Break-contact *s1* opens the pulse-circuit of the counting circuit US so that this is locked up on the position assumed. The relay GS becomes energized in a slightly delayed manner in order to permit all the individual relays KA, KB and so on of the connecting circuits concerned to become energized before the break-contact *gs1* opens. The relays KA and KB complete a holding circuit for themselves through make-contacts *ka2* and *kb2* and a second winding of themselves. The relay V in the connecting circuit VS, corresponding to relay KA, becomes energized through make-contacts *gs1*, *ka1* and *p1*. The relay V in the connecting circuit, which corresponds to the relay KB, cannot become energized, since the break-contact *ka1* is open. Closure of the make-contact *v1* results in re-energisation of the rotary magnet D in a circuit referred to hereinbefore with the result that the selector RK is operated to find the free line concerned in the desired direction. At the same time the relay H of the delay circuit concerned becomes energized through make-contacts *st*, *v2*, *b2*, wiper and outlet contact *c* of the selector RK. The free line is now marked, since the outlet contact *b* of selector RK is connected through break-contact *l2* and make-contact *h2* to the battery. Upon the selector RK finding the free line, the relay T becomes energized via make-contact *h2*, break-contact *l2*, wiper *m* and outlet contact *b* of the selector RK, the winding of the relay T and make-contacts *v2* and *st*. In the meantime the relay B has become de-energized due to opening of break-contact *v2*. However, during the movement of the selector RK the relay H in the delay circuit WS remained energized through make-contact *st*, *v2* and *h1*. At the same time the relay KA was held through make-contacts *v3* and *g3*, and the relay A remained locked up through make-contacts *v4* and *g4*. The break-contact *v1* opens the energisation circuit of the rotary magnet D and the make-contact *t1* closes the energisation circuit, for the relay C through make-contacts *st*, *t1* and *q1*. The break-contact *c2* opens the energisation circuit of the relays P and Q, and the make-contact *c2* closes a holding circuit for the relay C. The counting circuit TS is disengaged by the make-contact *p2*. The relay L of the line circuit LS becomes energized through the wiper and outlet contact *c* of the selector RK and make-contact *c1*. The opening of the contact *p1* results in that the relay V becomes de-energized while the opening of the make-contacts *p3* and *q3* causes de-energisation of the relay KA in the allotter AL. The message can now be transmitted through the conductor TZ1, wiper and outlet contact *a* of the set selector and make-contact *l3* in the selected line circuit through the conductor UL to its station of destination. The break-contact *l1* opens the energisation circuit of the relay B in the connecting circuit corresponding to the relay KB. If another free line were available in the direction concerned at this instant, the relay B would be held through the break-contact *l1* corresponding to this line and the selector RK of the connecting circuit VS corresponding to the relay KB would be set to this free line in the aforesaid manner.

What is claimed is:

1. An automatic telegraph system comprising a plurality of selector switches each having a plurality of outlets, a plurality of groups of lines representing different directions, means connecting said lines to respective outlets of all of said selector switches, additional outlets of each of said selector switches being respectively associated with said groups of lines, a plurality of waiting circuits each connected respectively to all of said additional outlets which are associated with the individual ones of said groups of lines, means for selectively setting said selector switches to the additional outlets which are associated with the group of lines representing a desired direction of calling in the event that all of the lines which represent said desired direction of calling are busy thereby to wait for a free line, means for timing the durations of waiting of the selector switches which are set to the last-mentioned additional outlets, and means connected for setting the selector switch which has been waiting the longest time to the first of said busy lines which becomes free.

2. A system as claimed in claim 1, including a plurality of control circuits respectively connected to actuate said selector switches, an allotter circuit connected to said waiting circuits for measuring the times of waiting of said waiting selector switches, a plurality of common multiple conductors connected between said allotter circuit and said control circuits, means connected to said selector switches to mark said common multiple conductors in accordance with the waiting times of said selector switches, and a locking circuit connected for indicating which selector switches have marked the respective common multiple conductors.

3. A system as claimed in claim 1, including a plurality of control circuits respectively connected to actuate said selector switches, a common allotter circuit, a plurality of common multiple conductors connected between said common allotter circuit and said control circuits, said allotter circuit having a delay outlet, each of said control circuits including a switching means connected to said delay outlet to be actuated by said allotter circuit, means responsive to said switching means for marking one of said common multiple conductors in accordance with the delay indicated at said delay outlet, testing means for supplying a testing signal to said common allotter circuit to test said common multiple conductors in the sequence of decreasing delay, and a blocking circuit responsive to said testing signal and connected to actuate the selector switch which has been waiting for the longest time.

References Cited in the file of this patent

UNITED STATES PATENTS

| | | |
|---|---|---|
| 2,575,329 | Blanton | Nov. 20, 1951 |
| 2,654,797 | Knandel | Oct. 6, 1953 |
| 2,667,533 | Zenner | Jan. 26, 1954 |
| 2,676,199 | Bacon | Apr. 20, 1954 |
| 2,776,333 | Neiswinter | Jan. 1, 1957 |